May 7, 1940. K. H. BOOTY 2,199,536
BICYCLE
Filed Jan. 11, 1936 5 Sheets-Sheet 3
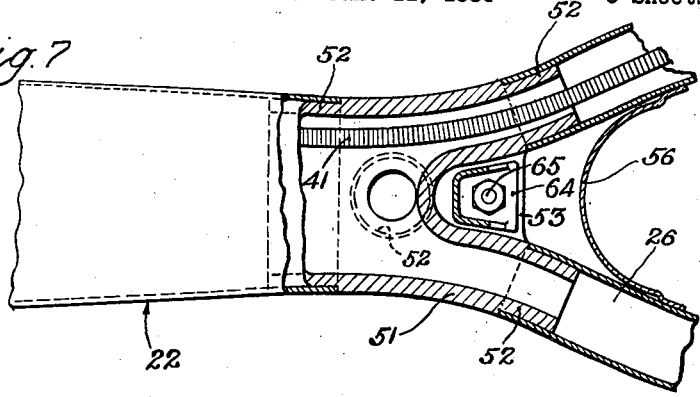
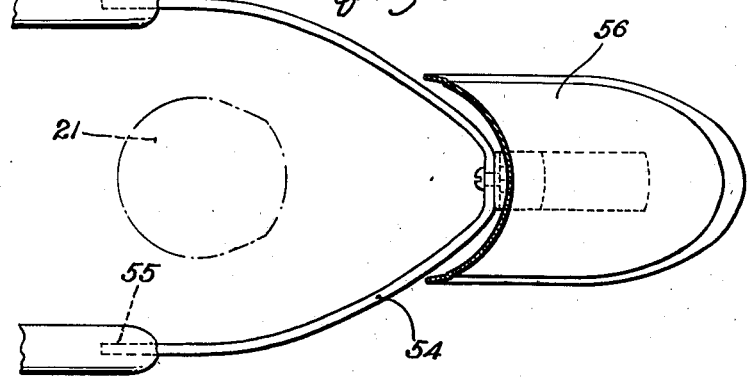
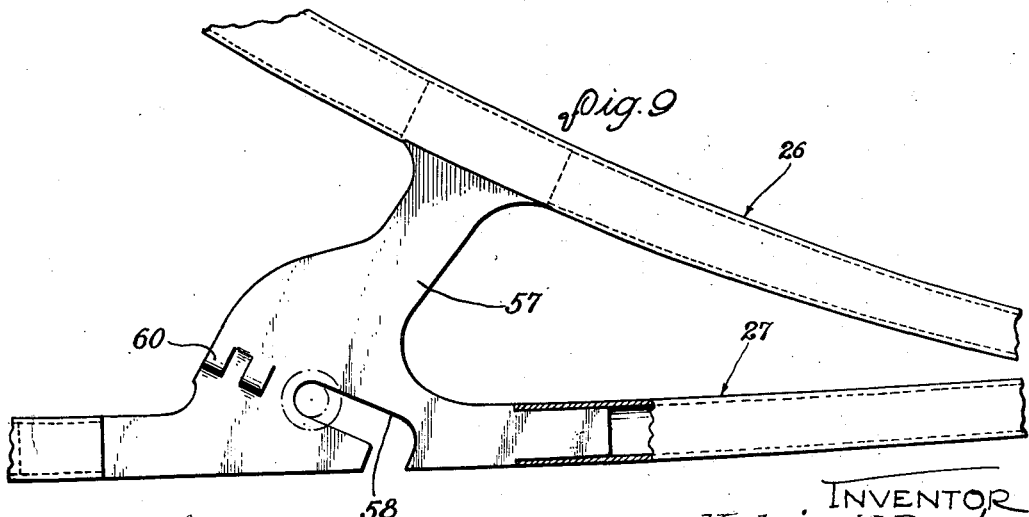
INVENTOR
Kelvin H. Booty
By Parker, Carlson, Pitzner & Hubbard
ATTORNEYS

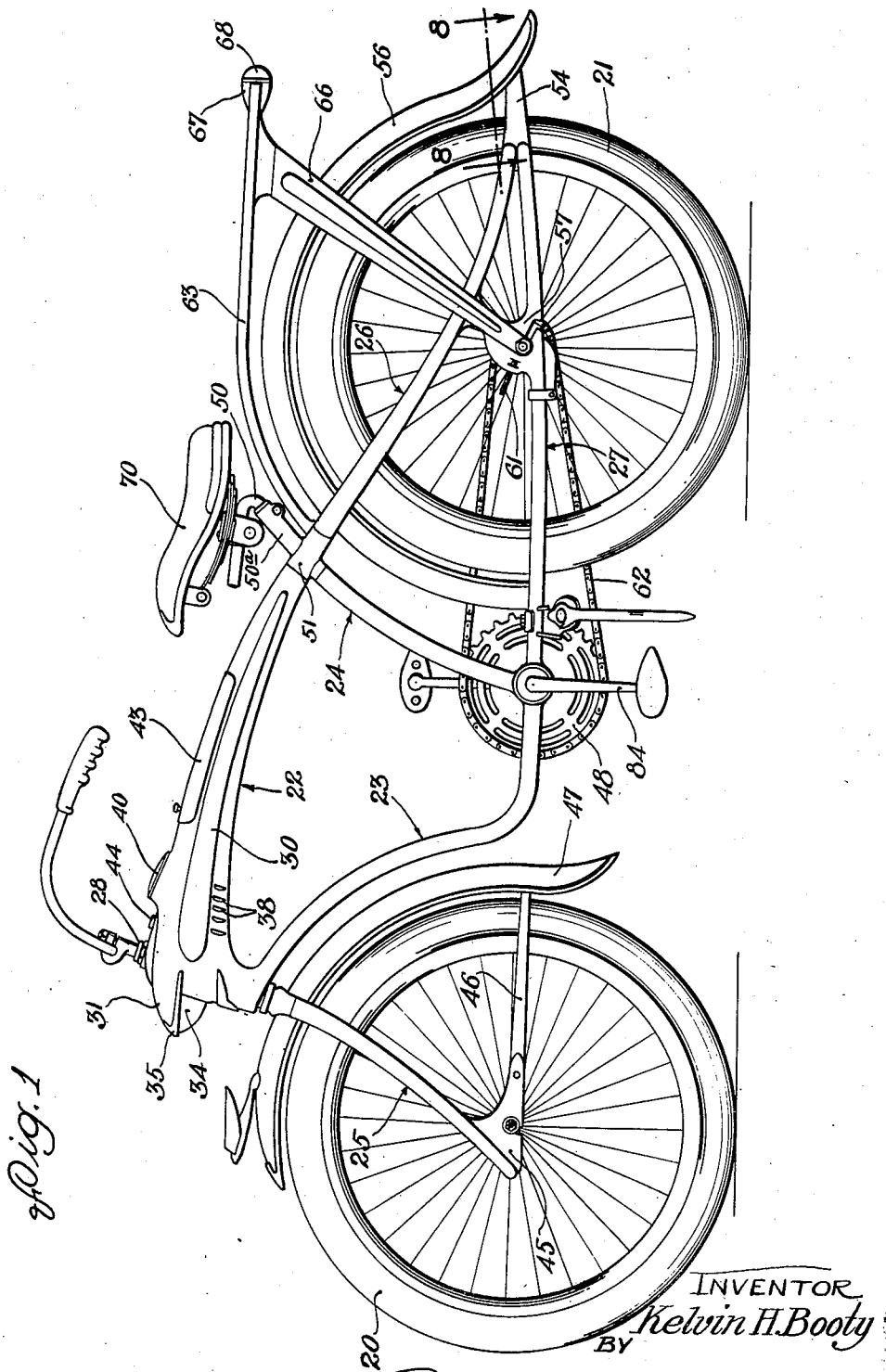

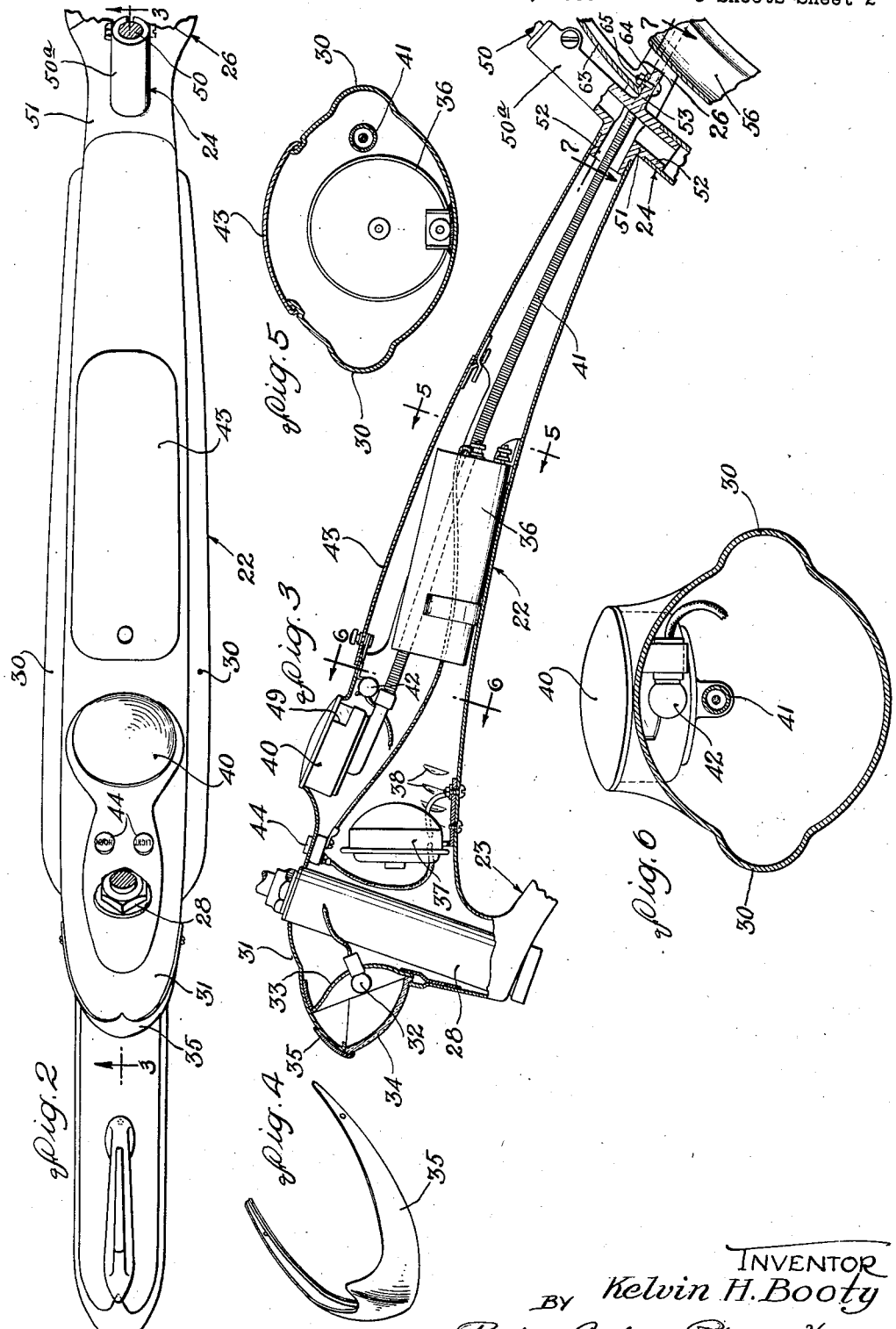

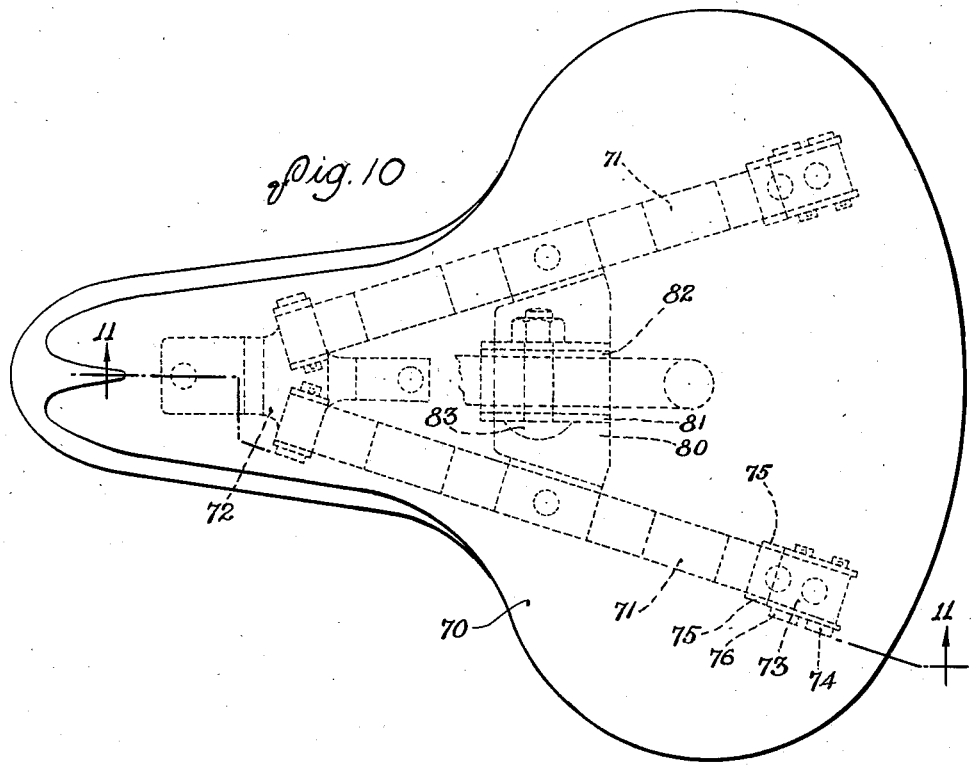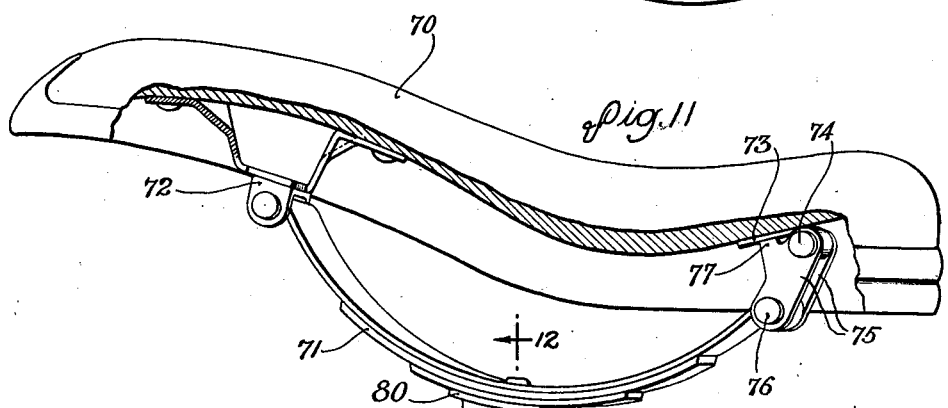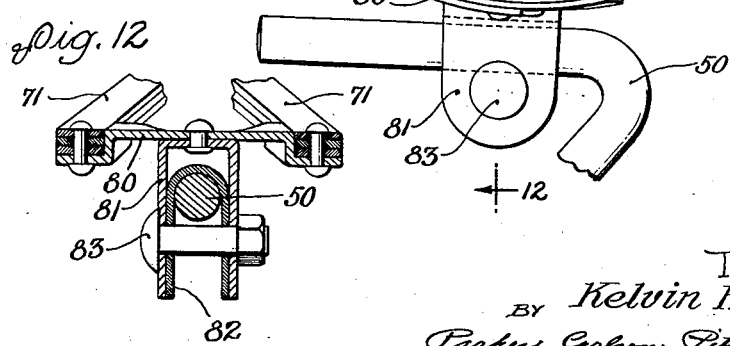

May 7, 1940.　　　　　　K. H. BOOTY　　　　　　2,199,536
BICYCLE
Filed Jan. 11, 1936　　　　5 Sheets-Sheet 5
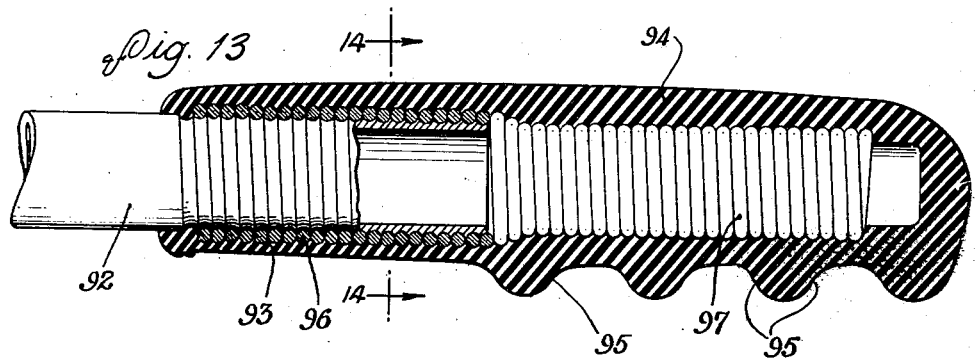
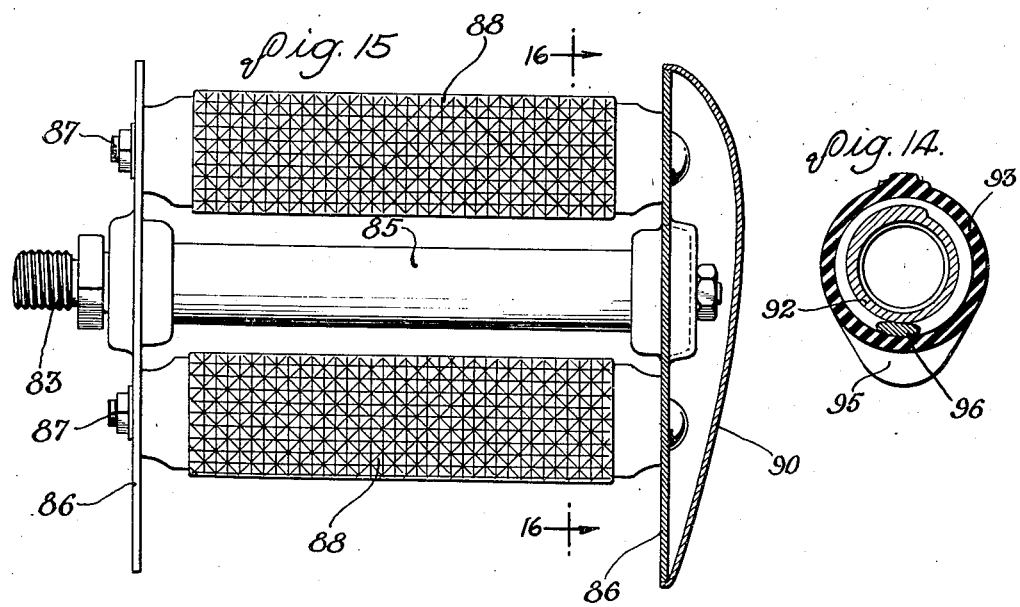
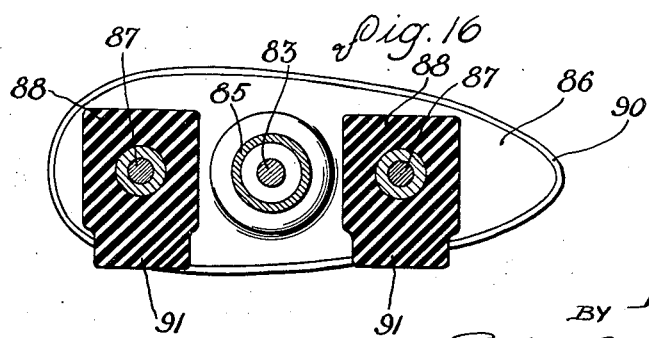
INVENTOR
BY Kelvin H. Booty
Parker, Carlson, Pitzner & Hubbard
ATTORNEYS Patented May 7, 1940

2,199,536

UNITED STATES PATENT OFFICE 2,199,536

BICYCLE

Kelvin H. Booty, Chicago, Ill., assignor to Sears, Roebuck and Co., Chicago, Ill., a corporation of New York Application January 11, 1936, Serial No. 58,640

4 Claims. (Cl. 280—281)

The invention relates to bicycles, and has for its principal object the provision of a bicycle having a novel streamlined construction of great strength but of light weight, the elements being arranged and related to carry the rider in a comfortable, easy-pedalling position.

It is also an object to provide a bicycle in which the top frame member is enlarged in a novel manner to provide a casing for such accessories as a headlight, speedometer, and horn as well as to provide an enclosed space for an electric battery to operate the electrical accessories and for tools.

Another object is to provide a bicycle having a frame construction supported on the wheels in a novel manner and comprising frame members in a new interrelation providing great strength and rigidity for the frame.

More specifically it is an object to provide a bicycle having a novel frame construction including a top member sweeping rearwardly and downwardly, to provide a streamline effect, an upper fork for the rear wheel constituting a continuation of the lines of the top member, a lower rear fork meeting the upper fork at a point adjacent the rear edge of the rear wheel, and a front fork extending downwardly and forwardly to a point in front of the axis of the front wheel.

A further object is to provide a saddle for a bicycle having a novel spring construction providing great comfort for the rider and permitting the seat member to be located closely adjacent the frame of the bicycle.

A still further object is to provide a pedal structure streamlined in appearance and so constructed that it tends to assume the proper position for such streamlining in relation to the bicycle of which it forms a part, said position being the normal position to receive the rider's foot.

Still another object is to provide grips for the handle bar, which amply absorb shocks, which are firmly attached to the handle bar without danger of accidentally slipping off, and which are reinforced in such manner that, while their resilience is retained, they are practically unbreakable.

Other objects and advantages will become apparent from the following description taken in connection with the accompanying drawings, in which:

Figure 1 is a side elevational view of a bicycle embodying the features of the invention.

Fig. 2 is a fragmentary plan view of the bicycle shown in Fig. 1.

Fig. 3 is a longitudinal vertical section taken on the line 3—3 of Fig. 2.

Fig. 4 is a perspective view of a part used in connection with the headlight.

Fig. 5 is a transverse vertical section taken on the line 5—5 of Fig. 3.

Fig. 6 is a transverse vertical section taken on the line 6—6 of Fig. 3.

Fig. 7 is a fragmentary longitudinal section taken on the line 7—7 of Fig. 3.

Fig. 8 is a fragmentary horizontal section taken on the line 8—8 of Fig. 1.

Fig. 9 is an enlarged side elevation of the forks for the rear wheel.

Fig. 10 is a plane view of a saddle.

Fig. 11 is a side elevational view of the saddle.

Fig. 12 is a fragmentary transverse section taken on the line 12—12 of Fig. 11.

Fig. 13 is a sectional view of a handle bar grip.

Fig. 14 is a transverse section taken on the line 14—14 of Fig. 13.

Fig. 15 is a plane view, partially in section, of a pedal.

Fig. 16 is a sectional view taken on the line 16—16 of Fig. 15.

A bicycle embodying the features of the invention is designed to have a streamlined appearance and, at the same time, great strength as well as easy riding qualities. To this end, it has a frame comprising generally a plurality of members so shaped and united and so related to the wheels that the suggestion of strength and the ability to operate the bicycle at high speeds with little effort is implied. To this end, the frame includes a top member of relatively large cross section adjacent the front end and tapering rearwardly. The top member sweeps rearwardly and downwardly, with a fork for the rear wheel constituting an extension thereof, to a point adjacent the rear edge of the rear wheel, while a fork for the front wheel extends downwardly and forwardly with the axis for the front wheel located rearwardly of the lower end of said fork. A lower frame member extends from the upper end of the front wheel fork downwardly on an arc about the axis of the front wheel, and thence horizontally rearwardly to meet the rear fork and in effect form a continuation thereof, at a point adjacent the rear edge of the rear wheel. From the meeting point of the lower frame member and the lower rear fork, a rear frame member extends upwardly and rearwardly, substantially on an arc concentric with the rear wheel, to a point where the top member meets the upper rear fork, thereby locating the seat post for the saddle well toward the rear of bicycle in an easy-pedaling position.

The top member has a portion projecting forwardly of the steering post and of a generally rounded form in which portion a headlight is incorporated in such manner as to throw light forwardly and downwardly. The top member is hollow and the large cross-section thereof in the fore part thereof provides space for accessories. Thus, the top member may be utilized as a container for a battery and for tools, and a distance indicating device and a horn may be mounted therein.

The preferred embodiment also includes a saddle of novel construction having an easy riding quality by virtue of the fact that the seat member thereof is supported on leaf springs. The pedals are shaped so that, when viewed from the side, they conform to the general streamlining of the bicycle as a whole, the construction being such that they tend to assume positions correlated to the streamlining and are always properly presented for instant engagement by the rider's foot. The bicycle is also equipped with handle bar grips reinforced and attached to the handle bar in such a manner that they are adequately flexible to absorb shocks and are strong and firmly attached to the handle bars.

As shown in the drawings, the bicycle comprises a frame supported on a front wheel 20 and a rear wheel 21. The frame comprises a top member 22, a lower member 23, a rear member 24, a front fork 25, an upper rear fork 26, a lower rear fork 27, and a relatively short front member 28 in which the front fork is journalled. The top member 22 is hollow and of a somewhat oval cross section with the longer diameter horizontal, the cross-sectional area being relatively large at the front end and tapering rearwardly. Along the respective sides of the top member, a pair of rounded ribs or bulges 30 may be formed, which correspondingly taper toward the rear. The top member slopes gently and sweepingly downwardly toward the upper rear fork 26 which constitutes a continuation of the sloping top member and of the tapering thereof, thus accentuating the streamline effect.

At the front end, the top member has a forwardly extending projection 31 in front of the front frame member 28 (see Figs. 1, 2 and 3) which is generally rounded or ogival in form with the lower half thereof cut away. Within the projection, an electric headlight 32 and a reflector 33 therefor are mounted. Filling the cut-away area is a lens or glass 34 to complete the shape of the projection 31. The glass 34 is preferably retained in place by a strip 35 extending around the lower edge of the projection 31 and secured thereto as by screws. The strip 35 may be so shaped as to enhance the decorative effect, the preferred shape being illustrated in Fig. 4. Thus, the upper half of the projection 31 constitutes a shade to throw the light forwardly and downwardly.

The large cross-sectional area of the top member provides suitable enclosed space for carrying accessories. Thus, ample space for tools is provided, and a battery 36 to operate the various electrical devices may be located within this space with the wiring concealed therewithin. A horn 37 may be mounted within the top member with slots 38 along the respective sides of the top member to permit egress of the sound. The top surface of the top member provides a suitable location for a distance indicating device or speedometer 40, the dial thereof being readily observable by the rider. This device may be either of the types indicating total distance travelled, the rate of speed, or both. To operate this device, an operating cable 41 may extend rearwardly within the top member for concealment and thence downwardly within the upper rear fork 26 to a point adjacent the rear wheel for operative connection therewith. To illuminate the dial of the distance indicating device 40, a light 42 may be mounted within the top member adjacent an aperture 49 in the casing of the device 40, the light likewise illuminating the interior of the top member to facilitate locating tools therein. The aperture 49 may be covered with a transparent material such as isinglass to protect the device 40 from dust. Access to the interior of the top member may be had through a detachable cover 43 preferably located rearwardly of the distance indicating device 40, while switch buttons 44 to operate the horn and the lights may be mounted in the top surface in front of the device 40. The upper surface of the top member thus is a conveniently arranged instrument panel and gives the bicycle a neat, well-equipped appearance.

The top member, because of its prominence in obtaining the streamline appearance, and because of its strength, is apertured at its upper and lower surfaces to receive the front member 28 and permit the latter to extend through the top member. Thus, the construction of the top member eliminates the need for the usual head casting to provide a rigid connection with the front member. The enlargement of the top member at the front also enables it to meet and blend in with the front end of the lower member 23 and thereby conceal the front member 28 except for small portions at its upper and lower ends, as will be noted in Figs. 1 and 3.

The front fork 25 is rotatably mounted in the front member 28 and extends forwardly and downwardly in a moderate curve to terminate forwardly of the axis of the front wheel. To support the fork 25 on the wheel, a pair of triangularly shaped web-like members 45 are attached edgewise to the lower ends of the fork to extend rearwardly therefrom, and are slotted to receive the axle of the front wheel. The members 45 also extend rearwardly of the front wheel axle to support the legs of a U-shaped bracket 46 to the base of which the lower end of a mud-guard 47 may be attached, the mud-guard passing through the top of the front fork and being supported thereby.

The lower member 23 preferably extends arcuately about the front wheel from the union thereof with the top member and thence rearwardly in a substantially horizontal direction to the front end of the lower rear fork 27, the latter forming a continuation thereof. From the union of the lower member 23 and the lower rear fork 27, the rear member 24 extends upwardly, the union of these three parts being enlarged to receive the usual bearings for a pedal sprocket 48. The rear member 24 extends upwardly and rearwardly, substantially on an arc concentric with the rear wheel, to the point where the top member 22 and the upper rear fork 26 meet.

The top member 22, the rear member 24, and the upper rear fork 26 are rigidly connected by means of a cluster casting 51 provided with a plurality of shouldered lugs 52 telescoping into the respective members and the arms of the rear fork 26, the ends thereof abutting the shoulders on the lugs to provide a smooth exterior. The casting 51 comprises a body portion having an oval cross-section, with its longest diameter horizontal, and extending forwardly to provide the lug fitting into the oval end of the top member 22. The body of the casting extends rearwardly in bifurcated form to provide the two lugs for the respective arms of the rear fork 26, while a downwardly extending lug is provided for the rear member 24. Between the two lugs over which the two arms of the rear fork 26 telescope, a flat web 53 is provided to stiffen the casting. The casting also has an upwardly and rearwardly extending tubular portion 50ᵃ to receive and support a seat post, the tubular portion 50ᵃ constituting in effect, a continuation of the rear member 24. The casting 51 is hollow throughout, and the cable 41 for the distance indicating device 40, which extends within the top member 22, passes through the cluster casting and into one of the arms of the rear fork 26.

As mentioned above, the two rear forks 26 and 27 meet at a point adjacent the rear edge of the rear wheel. To rigidly connect the ends of the two forks, a U-shaped member 54 (see Figs. 1 and 8) extends around the periphery of the rear wheel. Each end of the member 54 has a pair of projections 55 entering the ends of the respective forks, which ends are in edge-to-edge relation, so that the member 54 constitutes a continuation of the two forks. The member 54 thus secures the ends of the two forks together and holds the two sides of each fork in spaced relation to receive the rear wheel therebetween.

The U-shaped member 54 also serves as a support for the rear end of a mud-guard 56. The latter extends arcuately over the upper portion of the rear wheel within the two rear forks with the front end of the mud-guard located within the lower rear fork 27. The rear end of the mud-guard is preferably curved rearwardly, as will be noted in Fig. 1, to contribute to the streamline effect.

To give strength to the assembly of the two rear forks, they are rigidly connected at a point spaced from their meeting point and the member 54. To this end, on each side of the forks, a web 57 (Fig. 9) is provided which extends across the angle between the forks and is inserted into the tubular pieces of which the rear forks are constructed. The webs 57 are located at the axis of the rear wheel so that the stiffening effect of the webs occurs at the point where the load is supported. Thus, the webs 57 are notched as at 58 to receive the rear wheel axles. The webs are also pressed to provide screw-receiving portions 60, in which screws 61 (see Fig. 1) are threaded to adjust the position of the wheel axle in the notch 58 and thereby adjust the tension on the usual chain 62 connecting the pedal sprocket 48 and a sprocket (not shown) on the rear wheel.

The preferred embodiment may also be equipped with a luggage carrier, the lines of which conform to the streamline appearance of the bicycle as a whole. Thus, the luggage carrier comprises a luggage carrying frame 63 (see Fig. 1) which extends horizontally rearwardly from a point over the axis of the rear wheel. From that point forwardly, the frame 63 follows the curvature of the wheel with its forward end located immediately in the rear of the rear frame member 24, where it is rigidly secured to the cluster casting 51. To this end, the front end of the luggage carrying frame 63 has a transverse wall 64 (see Fig. 3) at its end, which is shaped to conform to and abut the top surface of the web 53 between the two lugs 52 for the upper rear fork, and is rigidly connected thereto by a bolt 65.

The rear end of the luggage carrying frame 63 is preferably supported by a forked brace 66 which is supported at its lower end on the axle of the rear wheel. The brace 66 extends upwardly and rearwardly to a point adjacent the rear end of the luggage carrying frame 63. At its rear end, the luggage carrying frame 63 may be provided with a rounded enlargement 67 (see Fig. 1) to receive a tail-light or a reflector 68 serving in place of a tail-light.

Another feature of the invention resides in the construction of the saddle, in which a novel arrangement of springs is provided to attain especially comfortable riding qualities. As shown herein, the saddle comprises a seat member 70 (see Figs. 10 and 11) of the usual shape. The seat member 70 is supported by two sets 71 of bowed leaf springs located on the respective sides of the center line of the bicycle at an angle to each other with the apex of the angle under the front end of the seat member. Each set of springs comprises a plurality of leaves of varying length. Preferably the front ends of the sets 71 of springs are pivotally attached to the seat member 70 by means of a fixed bracket 72.

Since the springs increase in length when under load, due to the flattening of the bow therein, the other ends of the springs are attached to the seat member to allow for such increase. To this end, attached to the seat member 70 adjacent the rear end of each spring is a bracket 73 to which is pivotally attached, as at 74, a shackle 75 comprising a pair of spaced links. The shackle 75 extends downwardly and forwardly and is pivotally attached at its lower end, as at 76, to the spring. Thus, when the spring increases in length under load, the shackle 75 swings rearwardly to allow for such increase.

In order to prevent the seat member 70 from rebounding above its normal position and to steady it, the shackle 75 is constructed to limit the bowing of the spring to its normal amount. Thus, each link of the shackle has a boss 77 (Fig. 11) adapted to abut against the underside of its bracket 73 and limit the forward swinging movement of the shackle, thereby limiting the bowing of the spring.

The two sets of springs are supported by means detachably secured to the seat post. For this purpose, a bridge 80 extends transversely of the springs and supports the two springs on its respective ends, the springs preferably being riveted thereto. Attached intermediate the ends of the bridge 80 is a channel-shape clip 81 and a U-shaped bushing 82 embracing the seat post 50 and adapted to be clamped thereto by a bolt 83.

With springs of this type, which are relatively flat and do not occupy much vertical height, the saddle may be placed down close to the frame members of the bicycle without interfering with the spring movement. The saddle thus has a compact appearance and, because of the downward sweep of the top member 22, the level of the top of the saddle is substantially the same as the upper surface of the top member at the front end thereof, thus accentuating the streamline appearance.

The preferred embodiment also includes, as a novel feature thereof, a form of pedal (see Figs.

15 and 16) which conforms to the streamlines of the bicycle and is so constructed as to have a tendency to assume such a position that its form is properly correlated to the streamlining of other parts of the bicycle. Moreover, such position is the one which the pedal has when the rider's foot is placed thereon. As shown in the drawings, each pedal comprises an axle 83 adapted to be screwed into the usual crank arm 84 (see Fig. 1) for driving the sprocket 48. Journalled on the axle 83 is a tubular member 85 which is preferably enlarged at its ends to provide space for antifriction bearings (not shown). Extending transversely of the tubular member 85 at its respective ends are a pair of end members 86 comprising flat plates having a tear-drop or streamline shape. A pair of rods 87 extend parallel to the axle 83 on opposite sides thereof to connect the end members 86 and to support a pair of foot pads 88 preferably made of rubber. The axle 83 and the two rods 87 extend to the outer face of the outer end member, as will be noted in Fig. 15, and a casing 90 is provided to enclose said outer face and the ends of the axle 83 and two rods 87. The casing 90 has the same shape as the end member 86 and is generally rounded in cross-section to conform to the tear-drop or streamline appearance.

In order that the pedal may assume a predetermined position, that is, a position in which the tear-drop shape of the end members 86 and casing 90 extends horizontally, it is constructed so that its center of gravity is below its axis of rotation, and the construction is also such as to compensate for the lack of symmetry of the end members 86 and casing 90 about the axis of rotation. To this end, the foot pads 88 are provided with downwardly extending portions 91, the weight of which causes the center of gravity of the pedal as a whole to lie below the axis of the axle 83. Moreover, the weight of the portion 91 on the front foot pad is slightly greater than the weight of the portion 91 on the rear foot pad, as will be noted from their comparative sizes in Fig. 16, to compensate for the lack of balance due to the shape of the end members 86 and casing 90. Thus, the pedal at rest will assume a horizontal position so that the tear-drop shape of the end members and casing are properly correlated to the bicycle as a whole and so that the pedal is in proper position to receive the rider's foot.

The handle bar and its grips also are of novel construction to provide a resilient grip which is unbreakable in normal use and may be readily removed from the handle bar but cannot accidentally slip off of it. In Figs. 13 and 14, the handle bar is shown at 92 and is of tubular construction. Telescoped over each end of the handle bar is a grip comprising an attaching portion 93 and a grip portion 94 which extends beyond the end of the handle bar. The grip is preferably made of yieldable material such as rubber, and the grip portion 94 may be shaped to provide finger grooves 95.

Secured to the handle bar 92 and extending beyond the end thereof within the grip is a reinforcing member which is flexible but which prevents any sharp bends in the grip when forced laterally. In the preferred construction, the reinforcing member comprises a closely wound coil spring having a portion 96 threaded onto grooves in the handle bar 92, and a portion 97 extending beyond the end of the handle bar. The portion 97 is preferably of smaller diameter than the portion 96 to limit the distance which the grip may be telescoped over the handle bar. The spring is preferably embedded in the rubber grip at the time the latter is molded. The grip is thus flexible but is reinforced so that it cannot be given a sharp bend, and may be readily removed from the handle bar.

From the above description, it will be apparent that I have provided a bicycle the parts of which are so shaped as to give the bicycle a streamline appearance suggesting the strength thereof without great weight and providing a comfortable, easy-riding position for the operator. The top member 22 is shaped in a novel manner at its forward end to include a headlight, and is also so constructed that a horn may be enclosed therein and a speedometer may be located in the top surface thereof. The bicycle thus is completely equipped as to accessories which are included in a manner providing a finished appearance. The frame, by virtue of the tapering shape of the top member and its rearwardly sweeping form together with the relation of the front and rear forks to the wheels gives the streamline effect as well as providing a sturdy construction. The location of the seat post and the novel construction of the saddle give ease in riding and permit the saddle to be mounted down close to the frame, while the handle bar grips provide flexibility without danger of breaking when bent. The pedals, in appearance, conform to the appearance of the bicycle as a whole and tend to assume the proper position both to attain such appearance as well as to be in proper position for the riders foot.

I claim as my invention:

1. In a bicycle, the combination of a hollow top frame member of oval cross section with its longest diameter horizontal, a hollow rear frame member, a pair of hollow members constituting the two arms of a rear wheel fork, and a casting for rigidly connecting all four of said members having a plurality of lugs telescoping into said members, the body of said casting being oval-shaped in cross section and extending forwardly to provide a lug fitting into said top member and extending rearwardly in bifurcated form to provide the lugs for the two arms of the rear fork, the lug for the rear member extending downwardly from the body, said casting also having tubular portion extending upwardly and rearwardly to receive a seat post and constituting an extension of the rear member.

2. In a bicycle, the combination of a hollow top frame member, a pair of spaced tubular members constituting the two arms of a rear wheel fork, a cluster casting for rigidly connecting said members, said casting having a pair of lugs extending rearwardly at an angle to each other and telescoped into the two arms of the rear fork and having a web located between said pair of lugs, and a luggage carrier located over the rear wheel and having its front end seated on said web and rigidly secured thereto.

3. In a bicycle, the combination of a top frame member, a pair of spaced members constituting the two arms of a rear wheel fork, a rear frame member, a cluster casting having a plurality of lugs rigidly attached to the respective members, the lugs for the arms of the rear wheel fork extending rearwardly at an angle to each other with a reinforcing web located between and connecting the lugs for the arms, said web having a flat upper face, and a luggage carrier located over the rear wheel having a portion extending forwardly with a flat transverse wall seated on said web, and means rigidly holding said web and said wall together.

4. In a bicycle, the combination of a pair of spaced members constituting the two arms of a rear wheel fork, a cluster body having a plurality of lugs rigidly attached to the respective members, a reenforcing web located between and connecting the lugs, said web having an upper face, a luggage carrier located over the rear wheel and having a portion extending forwardly with a transverse wall seated over said web, and means rigidly holding said web and said wall together.

KELVIN H. BOOTY.